(12) United States Patent
Ziegler et al.

(10) Patent No.: US 8,901,901 B2
(45) Date of Patent: Dec. 2, 2014

(54) DIGITAL PHASE ADJUSTMENT FOR MULTI-PHASE POWER CONVERTERS

(75) Inventors: Silvio Ziegler, Tann (CH); Ivan Feno, Gossau (CH)

(73) Assignee: PAI Capital LLC, Camarillo, CA (US)

( * ) Notice: Subject to any disclaimer, the term of this patent is extended or adjusted under 35 U.S.C. 154(b) by 190 days.

(21) Appl. No.: 13/370,564

(22) Filed: Feb. 10, 2012

(65) Prior Publication Data

US 2012/0218792 A1    Aug. 30, 2012

Related U.S. Application Data

(60) Provisional application No. 61/441,490, filed on Feb. 10, 2011.

(51) Int. Cl.
*G05F 1/00* (2006.01)
*H02M 5/42* (2006.01)
*H02M 7/68* (2006.01)
*H02M 3/158* (2006.01)

(52) U.S. Cl.
CPC .... *H02M 3/1584* (2013.01); *H02M 2003/1586* (2013.01)
USPC ............................................ 323/271; 363/84

(58) Field of Classification Search
CPC .................... H02M 3/1584; H02M 2003/1586
USPC ................. 363/84, 87, 89; 323/268, 271–272
See application file for complete search history.

(56) References Cited

U.S. PATENT DOCUMENTS

| 5,235,504 | A | * | 8/1993 | Sood | 363/53 |
|---|---|---|---|---|---|
| 5,771,164 | A | * | 6/1998 | Murai et al. | 363/89 |
| 5,861,734 | A | | 1/1999 | Fasullo et al. | |
| 7,489,116 | B2 | * | 2/2009 | Lanni | 323/222 |
| 2007/0262823 | A1 | * | 11/2007 | Cohen et al. | 331/45 |
| 2009/0189583 | A1 | * | 7/2009 | Kawase et al. | 323/282 |
| 2009/0257257 | A1 | * | 10/2009 | Adragna et al. | 363/65 |
| 2010/0097041 | A1 | * | 4/2010 | Ayukawa et al. | 323/272 |
| 2010/0097828 | A1 | * | 4/2010 | Chen | 363/72 |
| 2010/0181970 | A1 | * | 7/2010 | Yang et al. | 323/218 |
| 2010/0244789 | A1 | * | 9/2010 | Osaka | 323/271 |
| 2010/0315849 | A1 | * | 12/2010 | Ingemi et al. | 363/89 |
| 2012/0224401 | A1 | * | 9/2012 | Phadke | 363/84 |

OTHER PUBLICATIONS

Yang et al: "A Novel Interleaving Control Scheme for Boost Converters Operating in Critical Conduction Mode," Journal of Power Electronics, vol. 10, No. 2, Mar. 2010, pp. 132-137.
International Search Report in corresponding PCT application No. PCT/US2012/024636, dated Aug. 29, 2012 (3 pp).

* cited by examiner

*Primary Examiner* — Timothy J Dole
*Assistant Examiner* — Yusef Ahmed
(74) *Attorney, Agent, or Firm* — Waddey Patterson; Mark J. Patterson; Gary L. Montle

(57) ABSTRACT

A multiphase power converter includes one or both of a phase control circuit and a valley switching locking circuit. The phase control circuit measures a phase difference between a first phase circuit and a second phase circuit and varies an on-time of a drive switch of the second phase circuit to produce and maintain a predetermined phase difference between the first phase circuit and the second phase circuit. When the multiphase power converter is operating in a discontinuous mode of operation, the valley switching locking circuit counts the number of zero crossings of an input current of the first phase circuit and blocks a second zero crossing detection signal from a waveform generator (i.e., PWM driver) associated with the second phase circuit until an input current of the second phase circuit has as many zero crossings as that of the first phase circuit input current.

25 Claims, 8 Drawing Sheets

DIGITAL PHASE ADJUSTMENT FOR MULTI-PHASE POWER CONVERTERS

CROSS-REFERENCES TO RELATED APPLICATIONS

This application claims benefit of the following patent application which is hereby incorporated by reference: U.S. Provisional Patent Application No. 61/441,490, entitled "DIGITAL PHASE ADJUSTMENT METHOD FOR MULTI-PHASE POWER CONVERTERS", filed Feb. 10, 2011.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

This invention relates generally to multiphase power converters that work in the transition or discontinuous mode. More particularly, the invention relates to maintaining a predetermined phase difference between the phases of the multiphase power converter and operating each phase of the multiphase power converter at its natural frequency in order to increase the efficiency of and reduce the electromagnetic noise produced by the multiphase power converter.

Operating multiple power converter phase circuits in parallel is desirable to improve efficiency, reduce current ripple and increase the frequency of the current ripple. Reduced current ripple together with increased frequency eases the design of the electromagnetic compatibility (i.e., electromagnetic noise) filter, while increased efficiency reduces the cooling requirements of the power converter for a given power conversion level (e.g., smaller heat sinks, running a power converter cooling fan at a lower fan speed, and/or eliminating the need for a power converter cooling fan).

One technique to improve efficiency and electromagnetic compatibility (EMC) behaviour is to employ converter topologies with zero-voltage and zero-current switching. However, quite often those topologies exhibit variable switching frequency, which makes it more difficult to synchronize multiple phases (i.e., operate the phases at a predetermined phase difference such as 180 degrees out of phase). In contrast, fixed switching frequency power converters can be phase controlled simply by establishing a fixed time delay between the time bases. Due to variations in the phase circuits, however, fixed frequency operation may cause a slight increase in electromagnetic noise emissions and non-optimal efficiency if the fixed frequency does not match the natural frequency of all of the phases of the multiphase power converter.

There are open-loop and closed-loop methods known to align the phases (i.e., parallel converters or phase circuits) of variable frequency multiphase power converters. The open-loop methods generate a fixed delay between the phases based on the measurement of the time period of a master phase circuit. However, because the natural switching frequency of each phase circuit is different due to component variances, the slave converters (i.e., slave phase circuits) cannot run at their natural frequencies. The open-loop phase control algorithms override the natural frequency of the slave phases by forcing the slave phases to switch at the same frequency as the master phase. As a result, the open-loop methods may deteriorate the conversion efficiency and EMC behaviour of the multiphase power converter because zero-voltage and zero-current switching conditions may not always be met in the slave phase circuits.

Closed-loop methods adjust the on-time of the slave phase circuits to obtain a fixed phase relationship. Under a closed loop method, all phases are operating at their natural frequencies, maintaining zero-voltage and zero-current switching. Therefore, multiphase power converters using closed loop methods of phase alignment maintain the desirable properties of soft-switching converters such as power conversion efficiency and EMC behaviour, but difficulties arise if one of the converters is running in a clamped frequency mode. To ensure valley switching, the natural frequency of the multiphase power converter can change abruptly due to hopping from one valley to another, which distorts the phase relationship and causes volatility in the input current to the multiphase power converter.

BRIEF SUMMARY OF THE INVENTION

In one aspect, a multiphase power converter includes a first phase circuit, a second phase circuit, and a controller. The first phase circuit includes a first input inductor, a first drive switch, and a first output diode. The first input inductor has a first end and a second end with the first end connected to a power source, for example an output of a rectifier connected to an alternating current power supply. The first drive switch is connected between the second end of the first input inductor and ground (e.g., circuit ground). The first output diode has its anode connected to the second end of the input inductor and its cathode connected to an output of the power converter.

The second phase circuit includes a second input inductor, a second drive switch, and a second output diode. The second input inductor has a first end and a second end with the first end connected to the power source. The second drive switch is connected between the second end of the second input inductor and ground. The anode of the second output diode is connected to the second end of the second input inductor and the cathode is connected to the output of the power converter. The controller includes a voltage control loop and a phase control circuit. The controller is operable to selectively turn the first drive switch of the first phase circuit on and off to cycle the first drive switch of the first phase circuit and to selectively turn the second drive switch of the second drive circuit on and off to cycle the second drive switch of the second drive circuit. The voltage control loop is operable to provide a default on-time as a function of a voltage at the output of the power converter, wherein the controller is operable to selectively turn the first drive switch on and off as a function of the default on-time provided by the voltage control loop. The phase control circuit is operable to determine an on-time for the second drive switch as a function of the default on-time and a phase difference between the first phase circuit and the second phase circuit, wherein the controller is operable to selective turn the second drive switch on and off as a function of the on-time for the second drive switch.

In one aspect, a multiphase power converter includes a first phase circuit, a second phase circuit, and a controller. The first phase circuit includes a first input inductor, a first drive switch, and a first output diode. The first input inductor has a first end and a second end with the first end connected to a power source (e.g., an output of a rectifier connected to an alternating current power supply). The first drive switch is connected between the second end of the first input inductor and ground (e.g., circuit ground). The anode of the first output diode is connected to the second end of the input inductor and the cathode is connected to an output of the power converter.

The second phase circuit includes a second input inductor, a second drive switch, and a second output diode. The second input inductor has a first end and a second end with the first end connected to the power source. The second drive switch is connected between the second end of the second input inductor and ground. The anode of the second output diode is connected to the second end of the second input inductor and the cathode is connected to the output of the power converter.

The controller includes a valley switching locking circuit. The controller is operable to selectively turn the first drive switch of the first phase circuit on and off to cycle the first drive switch of the first phase circuit and to selectively turn the second drive switch of the second drive circuit on and off to cycle the second drive switch of the second drive circuit. The valley switching locking circuit includes a first counter, a second counter, and a comparator. The first counter is operable to count zero crossings of a first zero crossing signal in a switching period of the first drive switch. The first zero crossing signal is associated with an input current of the first phase circuit. The second counter is operable to count zero crossings of a second zero crossing signal in a switching period of the second drive switch. The second zero crossing signal is associated with an input current of the second phase circuit. The comparator is operable to block the second zero crossing signal if the count of zero crossings of the second zero crossing signal in the switching period of the second drive switch corresponding to (i.e., associated with) the switching period or cycle of the first drive switch is less than the count of zero crossings of the first zero crossing signal in the switching period of the first drive switch.

In another aspect, a method of operating a multiphase power converter having a first phase circuit and a second phase circuit includes providing a default on-time via a voltage control loop of a controller of the multiphase power converter as a function of an output voltage at an output of the multiphase power converter. The controller turns a first drive switch of the first phase circuit on and off as a function of the default on-time provided by the voltage control loop. A phase control circuit of the controller determines an on-time for a second drive switch of the second phase circuit as a function of the default on-time and a phase difference between the first phase circuit and the second phase circuit. The controller turns the second drive switch of the second phase circuit on and off as a function of the determined on-time for the second drive switch. The multiphase power converter switches from a transition mode of operation to a discontinuous mode of operation when a switching period of the first drive switch is less than a minimum period.

A first counter of a valley switching locking circuit of the controller counts zero crossings of a first zero crossing signal in a switching period of the first drive switch. The first zero crossing signal is associated with an input current of the first phase circuit. A second counter of the valley switching locking circuit counts zero crossings of a second zero crossing signal in a switching period of the second drive switch corresponding to (i.e., associated with) the switching period or cycle of the first drive switch. The second zero crossing signal is associated with an input current of the second phase circuit.

A comparator of the valley switching locking circuit blocks the second zero crossing signal if the count of zero crossings of the second zero crossing signal in the switching period of the second drive switch corresponding to (i.e., associated with) the switching period or cycle of the first drive switch is less than the count of zero crossings of the first zero crossing signal in the switching period of the first drive switch. The controller turns the first drive switch of the first phase circuit on and off as a function of the default on-time and further as a function of a minimum period and the first zero crossing signal. The controller turns the second drive switch of the second phase circuit on and off as a function of the determined on-time for the second drive switch and further as a function of the minimum period and the second zero crossing signal when the second zero crossing signal is not blocked by the comparator.

BRIEF DESCRIPTION OF THE SEVERAL VIEWS OF THE DRAWINGS

Non-limiting and non-exhaustive embodiments are described with reference to the following figures, wherein like reference numerals refer to like parts throughout the various drawings unless otherwise specified.

DETAILED DESCRIPTION OF THE INVENTION

Figure 1:
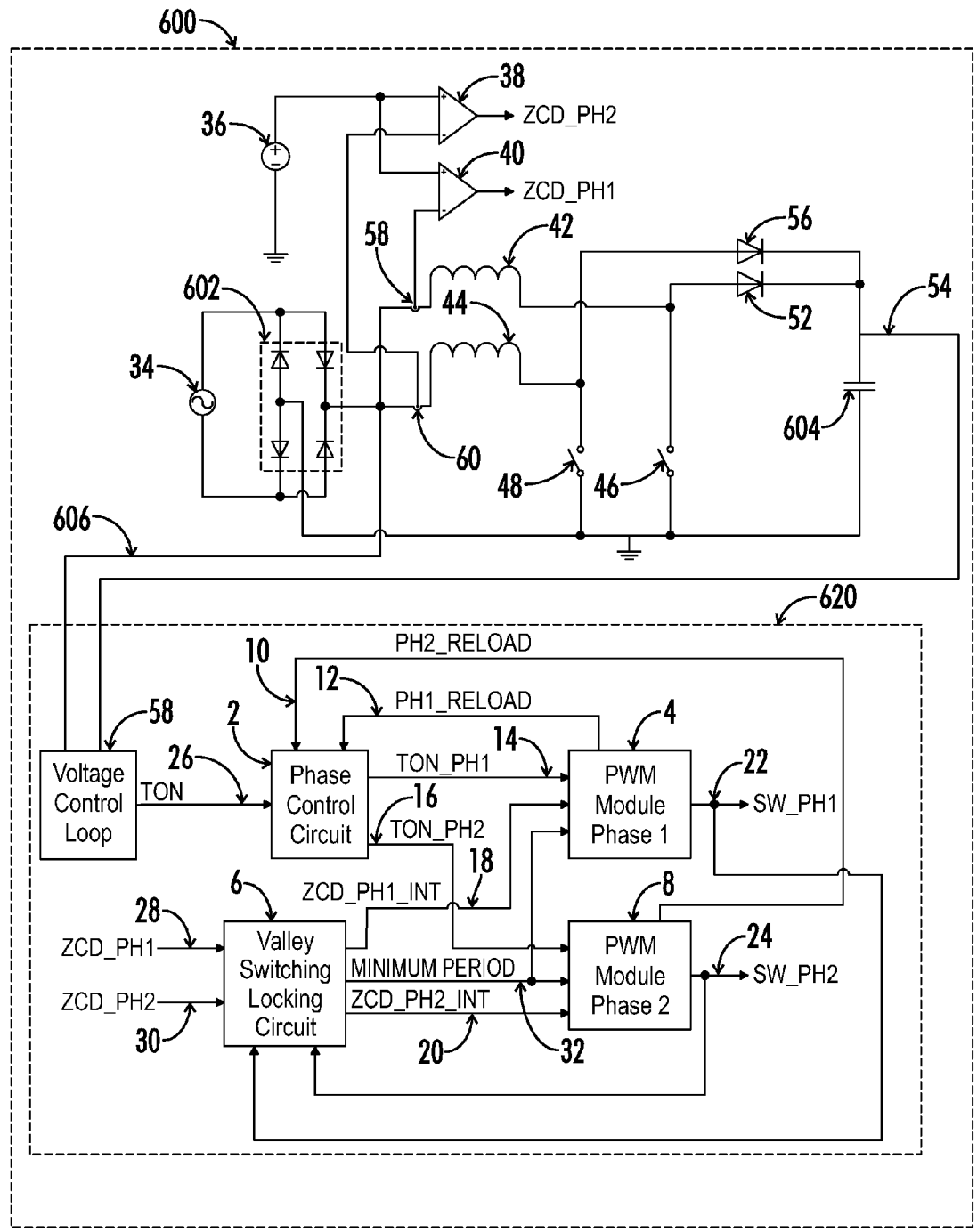
FIG. 1 is a schematic and block diagram of a multiphase power converter including a phase control circuit and a valley switching locking circuit.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The present disclosure provides a system and method to synchronize frequency and phase of multiple variable frequency power converters according to a closed-loop principle. In one embodiment, a proportional and/or integral controller adjusts the on-time of slave phases to obtain a desired phase relationship to a master phase. A valley switching locking circuit including a variable hysteresis for the clamping frequency is disclosed that avoids unstable behavior of the phase control during clamped frequency operation (e.g., a discontinuous mode of operation with a minimum frequency or period).

In one embodiment, a phase detector provides a proportional measure of a phase deviation or phase difference between phases of a multiphase power converter. A phase control circuit implements a proportional algorithm which modifies an on-time of a slave phase to maintain a desired phase relationship (i.e., phase difference or deviation from a desired phase difference) to a master phase. A gain of the phase control circuit can be adjusted to obtain the best possible dynamic behavior.

In another embodiment, the phase control circuit implements an integral algorithm to reduce error in the desired phase relationship. It is also contemplated that the proportional and integrative algorithms may be combined within the phase control circuit to obtain a so-called proportional/integral controller with superior dynamic properties.

In one embodiment, the performance of a multiphase power converter may be further improved via a valley switching locking circuit which ensures that slave phases are switching in the same valley as a master phase of the multiphase power converter. In one embodiment, the valley switching locking circuit includes a variable hysteresis to the clamping frequency to improve noise immunity.

It is contemplated that the multiphase power converter may include any number of phases (i.e., phase circuits) and that the phase circuits may reside in a single enclosure, or in multiple separate enclosures (e.g., in high power applications). Generally, the desired or predetermined phase difference or phase deviation between phases is 360 degrees divided by the number of phases (e.g., 180 degrees between phases in a 2 phase power converter and 90 degrees between phases in a 4 phase power converter), but it is contemplated that any phase difference or deviation may be achieved via embodiments of this disclosure.

Referring to FIG. 1, a multiphase power converter 600 includes a first phase circuit and a second phase circuit. Multiphase power converter 600 receives power from an AC power supply 34 via a full wave rectifier 602 and provides an output voltage at an output 54 at a high side of output capacitor 604. A low side of the output capacitor 604 is connected to circuit ground. The first phase circuit includes a first input inductor 42, a first drive switch 46, and a first output diode 52. A first end of the first input inductor 42 is connected to the output of the rectifier 602 (i.e., a power source) to receive an input voltage 606. A second end of the first input inductor 42 is connected to the anode of the first output diode 52. The cathode of the first output diode 52 is connected to the output 54 of the multiphase power converter 600. The first drive switch 46 is connected between the anode of the first output diode 52 and ground. It is contemplated that the first output diode 52 may be a traditional diode, or a rectification component comprising an active circuit performing the function of a diode. The rectification component may be, for example, a switch (e.g., a MOSFET or transistor) selectively switched on and off to allow current to the output 54 while preventing current from flowing from the output 54 to the second end of the first input inductor 42. The rectification component may implement active or synchronous rectification. In one embodiment, the rectification component is selectively switched on and off as a function of the input current to the first input inductor 42. An anode and cathode of the rectification component comprising a switch are determined based on the operation of the rectification component such that the anode and cathode of the rectification component correspond to the anode and cathode of a traditional diode used as the rectification component. A rectification component including an active circuit or switch may provide lower switching and power losses, resulting in higher efficiency and less heat production than a rectification component that is a traditional diode.

A second phase circuit includes a second input inductor 44, a second drive switch 48, and a second output diode 56. A first end of the second input inductor 44 is connected to the power source to receive the input voltage 606. A second end of the second input inductor 44 is connected to the anode of the second output diode 56. The cathode of the second output diode 56 is connected to the output 54 of the multiphase power converter 600. It is contemplated that the second output diode 56 may be a traditional diode, or a rectification component comprising an active circuit performing the function of a diode. The rectification component may be, for example, a switch (e.g., a MOSFET or transistor) selectively switched on and off to allow current to the output 54 while preventing current from flowing from the output 54 to the second end of the second input inductor 44. The rectification component may implement active or synchronous rectification. In one embodiment, the rectification component is selectively switched on and off as a function of the input current to the second input inductor 44. An anode and cathode of the rectification component comprising a switch are determined based on the operation of the rectification component such that the anode and cathode of the rectification component correspond to the anode and cathode of a traditional diode used as the rectification component. A rectification component including an active circuit or switch may provide lower switching and power losses, resulting in higher efficiency and less heat production than a rectification component that is a traditional diode.

A first comparator 40 compares a signal indicative of an input current 58 to the first input inductor 42 to a reference voltage 36 to provide a first input current zero crossing detection signal 28. A second comparator 38 compares a signal indicative of an input current 60 to the reference voltage 36 to provide a second input current zero crossing detection signal 30. The illustrated circuit to detect the zero crossing of the input currents to the first and second phase circuits serves only as one example of a zero crossing detector. It is contemplated that the zero crossing of the input current 58 to the first inductor 42 and the zero crossing of the input current 60 to the second inductor 44 can be detected by other means such as by adding an auxiliary winding to the first input inductor 42 and the second input inductor 44.

A controller 620 of the multiphase power converter 600 includes a voltage control loop 58, a phase control circuit 2, a valley switching locking circuit 6, a first waveform generator 4 (e.g., Phase 1 PWM module), and a second waveform generator 8 (e.g., Phase 2 PWM module). The voltage control loop 58 receives the input voltage 606 and the output voltage at output 54 and provides a default on-time 26 to the phase control circuit 2 as a function of the received inputs.

The phase control circuit 2 receives a first reload signal 12 from the first waveform generator 4, a second reload signal 10 from the second waveform generator 8, and the default on-time 26 from the voltage control loop 58, and provides an on-time for the first phase circuit 14 to the first waveform generator 4 and an on-time for the second phase circuit 16 to the second waveform generator 8 as a function of the received inputs.

The valley switching locking circuit 6 receives the first input current zero crossing detection signal 28 from the first comparator 40, the second input current zero crossing detection signal 30 from the second comparator 38, a first control signal 22 for the first drive switch 46, and a second control signal 24 for the second drive switch 48. The valley switching locking circuit 6 provides a first zero crossing signal 18 to the first waveform generator 4, a second zero crossing signal 20 to the second waveform generator 8, and a minimum period 32 to both the first waveform generator 4 and the second waveform generator 8 as a function of the received inputs.

The first waveform generator 4 receives the on-time for the first phase circuit 14, the first zero crossing signal 18, and a minimum period 32 and provides the first phase reload signal 12 and first control signal 22 as a function of the received inputs. The first phase reload signal 12 includes a reload pulse at a predetermined point in each period or cycle of the first drive switch 46. The first control signal 22 is coupled to a control terminal of the first drive switch 46 and determines whether the first drive switch 46 is on such that the first drive switch 46 is electrically conductive, or off such that the first drive switch 46 is not electrically conductive. The second waveform generator 8 receives the on-time for the second phase circuit 16, the second zero crossing signal 20, and the minimum period 32 and provides the second phase reload signal 10 and the second control signal 24 as a function of the received inputs. The second control signal 24 is coupled to a control terminal of the second drive switch 48 and determines whether the second drive switch 48 is on such that the second drive switch 48 is electrically conductive, or off such that the second drive switch 48 is not electrically conductive. The second phase reload signal 10 includes a reload pulse at a predetermined point in each period or cycle of the second drive switch 48.

The default on-time 26 is provided by an outer voltage control loop 58 to regulate the output voltage 54 by varying the default on-time 26. Instead of voltage control only, an inner current-control loop with an outer voltage control loop may also be implemented. The phase control circuit 2 adjusts the on-time of the second phase 16 to maintain the desired phase relationship between the first phase circuit and the second phase circuit. In one embodiment, the first phase is a master phase, and the second phase is a slave phase. The on-time of the master phase 14 is equal to the default on-time 26, and only the on-time 16 of the slave phase (i.e., second phase) is modified. The reload signals 10 and 12 of both PWM modules (i.e., the first waveform generator 4 and the second waveform generator 8) are fed into the phase control circuit 2 to allow for the measurement of the phase error, phase difference, and/or phase deviation from a target phase difference.

Figure 2:
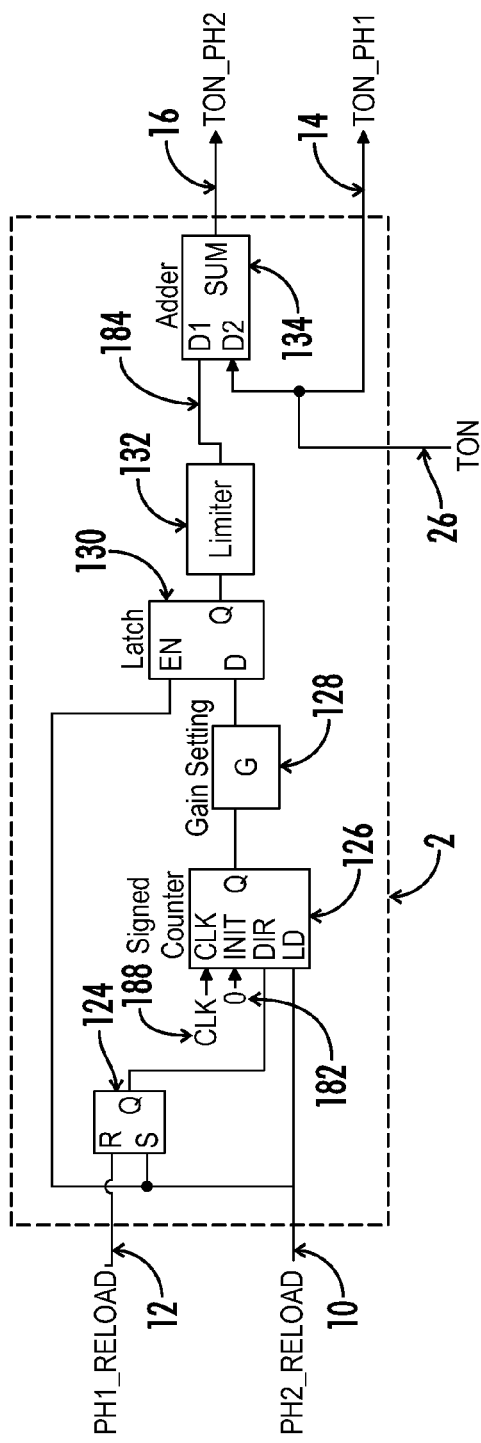
FIG. 2 is a block diagram of a phase control circuit implementing proportional control for a multiphase power converter.

Referring to FIG. 2, one embodiment of a phase control circuit 2 implementing proportional control includes a flip-flop 124 connected to a signed counter 126. The flip-flop 124 has a set terminal connected to the second phase reload signal 10, a reset terminal connected to the first phase reload signal 12, and an output connected to a directional input of the signed counter 126. Signed counter 126 also receives a clock signal 188, an initial signal 182, and the second phase reload signal 10 at a load terminal of the signed counter 126. An output of the signed counter 126, which is a measurement of the phase difference between the first phase and the second phase, is provided to a gain circuit 128 which multiplies the output of the signed counter by a gain constant to provide an output proportional to the measured phase difference from the signed counter 126 to a D input of a gated D latch 130. An enable input of the latch 130 receives the phase 2 reload signal 10. An output of the latch 130, which is proportional to a phase or time difference between the first phase circuit and the second phase circuit during a period of the first phase corresponding to a period of the second phase, is provided to a limiter 132 which ensures stability of the phase control circuit 2. The limiter 132 passes the limited, proportional, and measured phase difference 184 to an adder 134. The adder 134 also receives the default on-time 26 and provides the sum of the limited, proportional, and measured phase difference 184 and the default on-time 26 to the second waveform generator 8 as the on-time for the second phase 16. The phase control circuit 2 provides the default on-time 26 to the first waveform generator 4 as the on-time for the first phase 14.

FIG. 2 illustrates one possible implementation of a two-phase phase control circuit 2. A digital phase detector is realized by a flip-flop 124 that is connected to a signed counter 126. The first reload signal from the first phase 12 is connected to the reset input of the flip-flop 124 while the second reload signal from the second phase 10 is connected to the set input of the flip-flop 124. The output of the flip-flop 124 is connected to the direction input of a signed counter 126, which is clocked by a clock signal 188. The clock signal 188 defines the resolution of phase detection and therefore should have a clock frequency that is significantly larger than the switching frequency of the first and second phase circuits. During the switching period of one phase represented by the first reload signal 12, the counter is counting up and down controlled by the second reload signal of the second phase 10, so that at the end of the counting period a proportional measure of the phase difference to the desired phase angle, which can be set up using the init port 182 of the signed counter 126, is at the output of the signed counter 126. In the illustrated embodiment, the desired phase angle is set to 180 degrees, which results in an init value 182 of 0. The output of the signed counter 126 is connected to a gain circuit 128 which introduces the gain of the proportional controller. A latch 130 latches the state of the proportional-controller during the next switching cycle, where the phase difference between the two phases is evaluated again. A limiter 132 limits the output signal of the proportional controller, to avoid large deviations in the on-time between the phases that may lead to instable behavior. An adder 134 adds the limited output 184 from the limiter 132 to the default on-time 26, to control the phase according the desired angle set at the initial input 182 of the signed counter 126. It should be appreciated that the limiter 132 and adder 134 are optional, as it would be possible to directly use the output of the latch 130 to control the slave phase (i.e., second phase) on-time 16.

Figure 3:
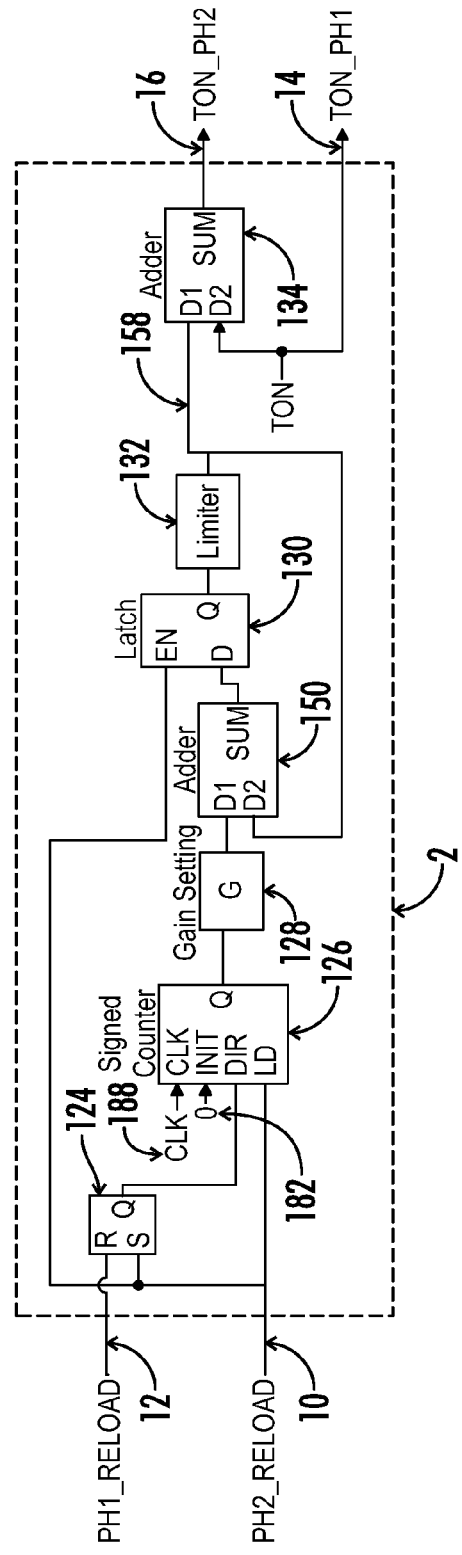
FIG. 3 is a block diagram of a phase control circuit implementing proportional and integral control for a multiphase power converter.

Referring to FIG. 3, one embodiment of a phase control circuit 2 implementing proportional and integral control includes a second adder 150 between the gain circuit 128 and the latch 130. The second adder 150 adds the output of the limiter 132 (i.e., a phase error time of the present cycle or period) to the output of the gain circuit 128 (i.e., a phase error time of a previous cycle or period) and provides the sum to the D input of the latch 130. The output 158 of the limiter 132 is also provided to the adder 134. Thus, a feedback loop is formed providing integral control in addition to the proportional control.

FIG. 3 depicts an embodiment of phase control circuit 2 where an integral and proportional controller is disclosed. The integrative behavior is achieved by feeding back the limited output 158 of the limiter 132 to the second adder 150. The gain of the integral controller can be modified by the gain circuit 128. Moreover, it is contemplated that integral control, without proportional control, can be achieved by omitting the gain circuit 128

Figure 4:
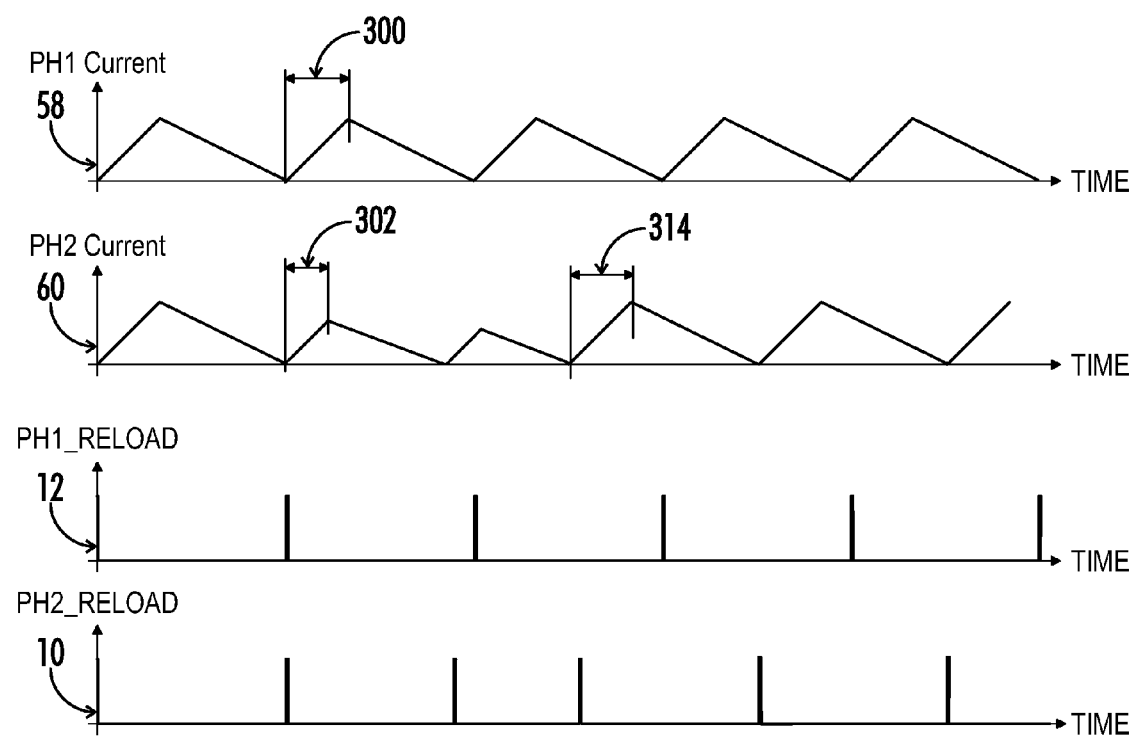
FIG. 4 is a timing diagram of a multiphase power converter starting in the transition mode and establishing a predetermined phase difference.

Referring to FIG. 4, a timing diagram shows the phase aligning process during startup in transition mode operation of the multiphase power converter 600 due to the phase control circuit 2. At startup, the first phase circuit and the second phase circuit are in phase. The on-time of the first phase 300 is relatively constant, while the on-time of the second phase 302 is decreased by the phase control circuit 2 in order to achieve the desired 180 degrees phase difference. Because of the included limiter 132, the multiphase power converter 600 requires several switching cycles to obtain the desired phase relationship. When the desired phase difference of 180 degrees is reached, the phase control circuit 2 provides an increased on-time 314 to the second drive switch 48 of the second drive circuit which is closer to or equal to that of the first phase on-time 300. The multiphase power converter 600 transitions to a discontinuous mode of operation.

Figure 5:
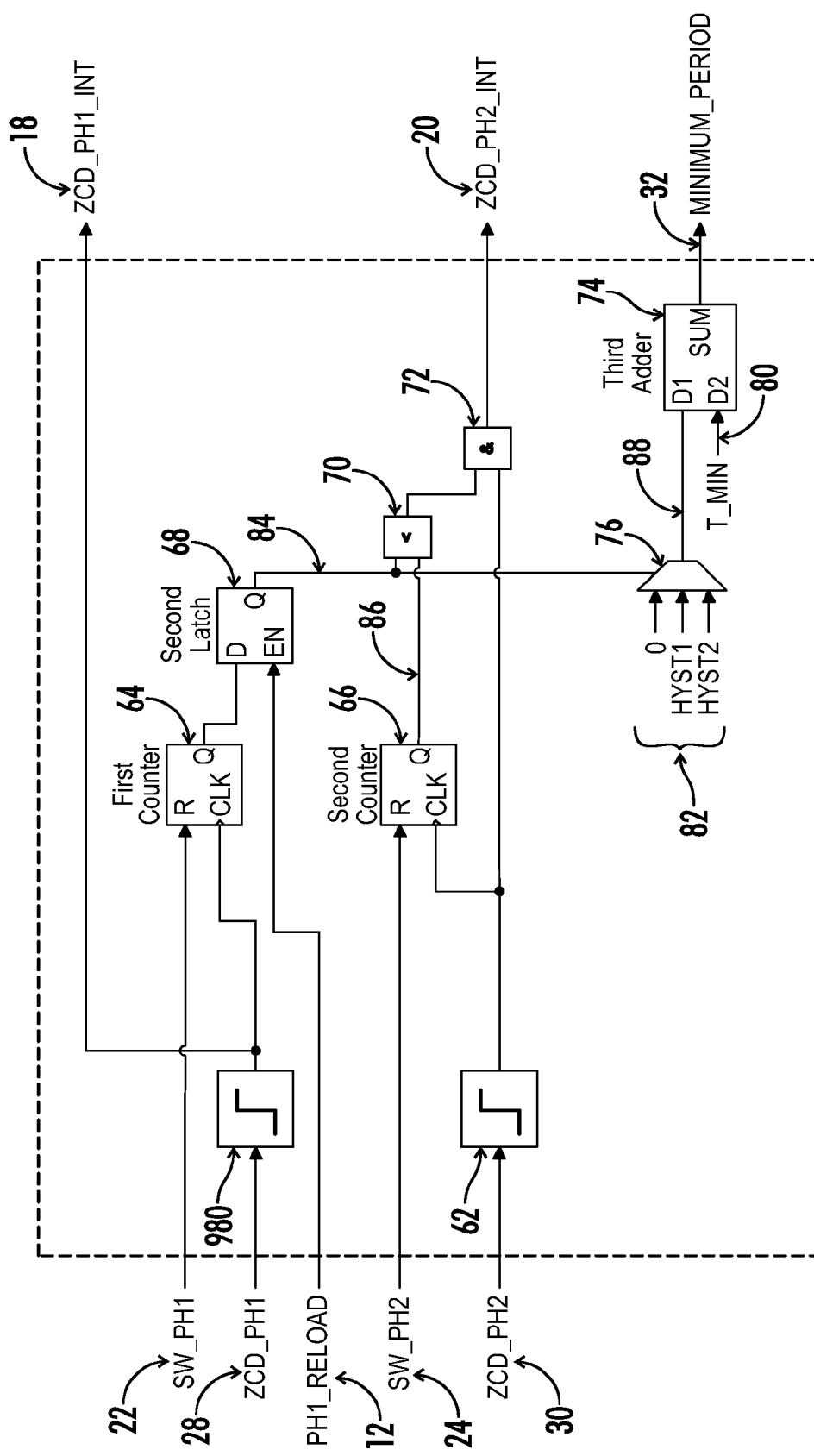
FIG. 5 is a block diagram of a valley switching locking circuit for a multiphase power converter.

Referring to FIG. 5, the valley switching locking circuit 6 ensures that both the first phase circuit and the second phase circuit are always switching in the same valley once the multiphase power converter 600 is running in the clamped frequency mode (i.e., the discontinuous mode of operation). A first zero crossing detection circuit 980 provides a pulse to a clock input of a first counter 64 when the first zero crossing detection signal 28 changes from a low state to a high state indicating that the input current 58 to the first input inductor 42 has transitioned from positive to negative. This pulse is also provided to the first waveform generator 4 as the first phase zero crossing detection signal 18. A reset input of the first counter 64 receives the first control signal 22. An output of the first counter 64 is provided to a D input of a second latch 68, and an enable input of the second latch 68 receives the first phase reload signal 12. The output 84 of the second latch 68 is provided to a digital comparator 70. A second counter 66 receives the second control signal 24 at a reset input and a second zero crossing signal from a second zero crossing detector 62 at a clock input of the second counter 66. The digital comparator 70 also receives an output 86 of the second counter 66 and provides a digital high output when the output 86 of the second counter 66 is equal to or greater than the output 84 of the second latch 68. An AND logic gate 72 receives the output of the digital comparator 70 and the second zero crossing signal, and passes the second zero crossing signal to the second waveform generator 8 when the output of the digital comparator 70 is digital high.

Once the first phase circuit is working in the clamped frequency mode, the multiphase power converter 600 switches its operating mode to the discontinuous mode and the first zero crossing signal is blanked by the first waveform generator 4. To ensure zero-voltage switching of the first and second drive switches 46 and 48 during discontinuous mode, the next switching cycle is triggered in accordance with the next zero crossing, which means that the natural frequency of the first phase circuit jumps to a value defined by the oscillation characteristics of the current within the first input inductor 42. Because the first and second phase circuits (i.e., the master and slave phase phases) have different natural frequencies due to component variances, one phase will first transition into a higher order valley switching mode. To avoid uncontrolled hopping between valley switching modes, the slave phase is locked to the master slave by the disclosed valley switching locking circuit 6. The edges of the zero crossing signal from the first comparator 40 and second comparator 38 are captured by a first zero crossing detector 980 and a second zero crossing detector 62. The first zero crossing detector 980 drives a first counter 64, and the second zero crossing detector 62 drives a second counter 66. The master phase latches its count value by means of a second latch 68 after every reload event (i.e., reload pulse in the first reload signal 12). A comparator 70 compares the count value of the master phase 84 to the count value 86 of the second counter 66. The count value 86 of the second counter 66 is independent of the count value of the master phase 84. If the number of zero crossings of the slave phase 86 is smaller than the master phase 84, the zero crossing signal of the slave phase is blanked by the AND logic gate 72. In this embodiment, the master counter 64 (i.e., first counter 64) starts counting at zero while the slave counter 66 (i.e., second counter 66) starts at 1. It is contemplated that other counting schemes are operable within the valley switching locking circuit 6.

More generally, the zero crossing signal of the first phase 28 passes through a zero crossing detector 980 and drives a first counter 64, which counts the number of first zero crossings. If the first phase circuit is operating in the transition mode, no restriction is set onto the second zero crossing signal 30 of the second phase circuit and the second waveform generator 8 receives a second zero crossing signal 20 and switches in the transition mode like the first phase circuit. If the first phase circuit is switching after the second occurrence of the first zero crossing, the second phase circuit will be forced to also ignore the first zero crossing signal 30 which forces the second phase circuit to switch in the same valley as the first phase circuit. This also applies if the first phase circuit is switching in the third valley and so forth. The valley switching locking circuit 6 may be expanded to any number of slave phases.

If noise couples into the first zero crossing detector 980, the first phase (i.e., master phase) could rapidly change the valley in which it is switching. That is, the first phase circuit could be jumping from the second to the third valley. To avoid this phenomenon, a variable hysteresis for the frequency clamp is included in the valley switching locking circuit 6. The variable hysteresis circuit adjusts the minimum period 32 and therefore the maximum frequency for all phases, according to the valley switching mode of the first phase (i.e., master phase). For example, if the first phase is changing its switching mode from transition mode to the first valley, the minimum period 32 will be made slightly larger by a predefined hysteresis value, so as to avoid falling back into transition mode due to noisy zero crossing detection levels. The variable hysteresis circuit includes a multiplexer 76 and third adder 74. The hysteresis level 82 is selected by the output 84 of the second latch 68, and the multiplexer 76 provides a hysteresis value 88 to the third adder 74. The third adder 74 adds the provided hysteresis value 88 to a default minimum period 80 to generate the minimum period 32.

Instead of adding the hysteresis value 88 to the default minimum period, it is also possible to feed directly the absolute minimum period values (i.e., the minimum period 32) to the multiplexer 76 and omit the third adder 74. The hysteresis levels 82 can be increased slightly for every additional valley to obtain the best noise immunity at every valley or kept constant if no adaptive hysteresis is required. The valley switching locking circuit 6 can be expanded to selectively block or pass corresponding zero crossing signals to any number of phases.

Figure 6:
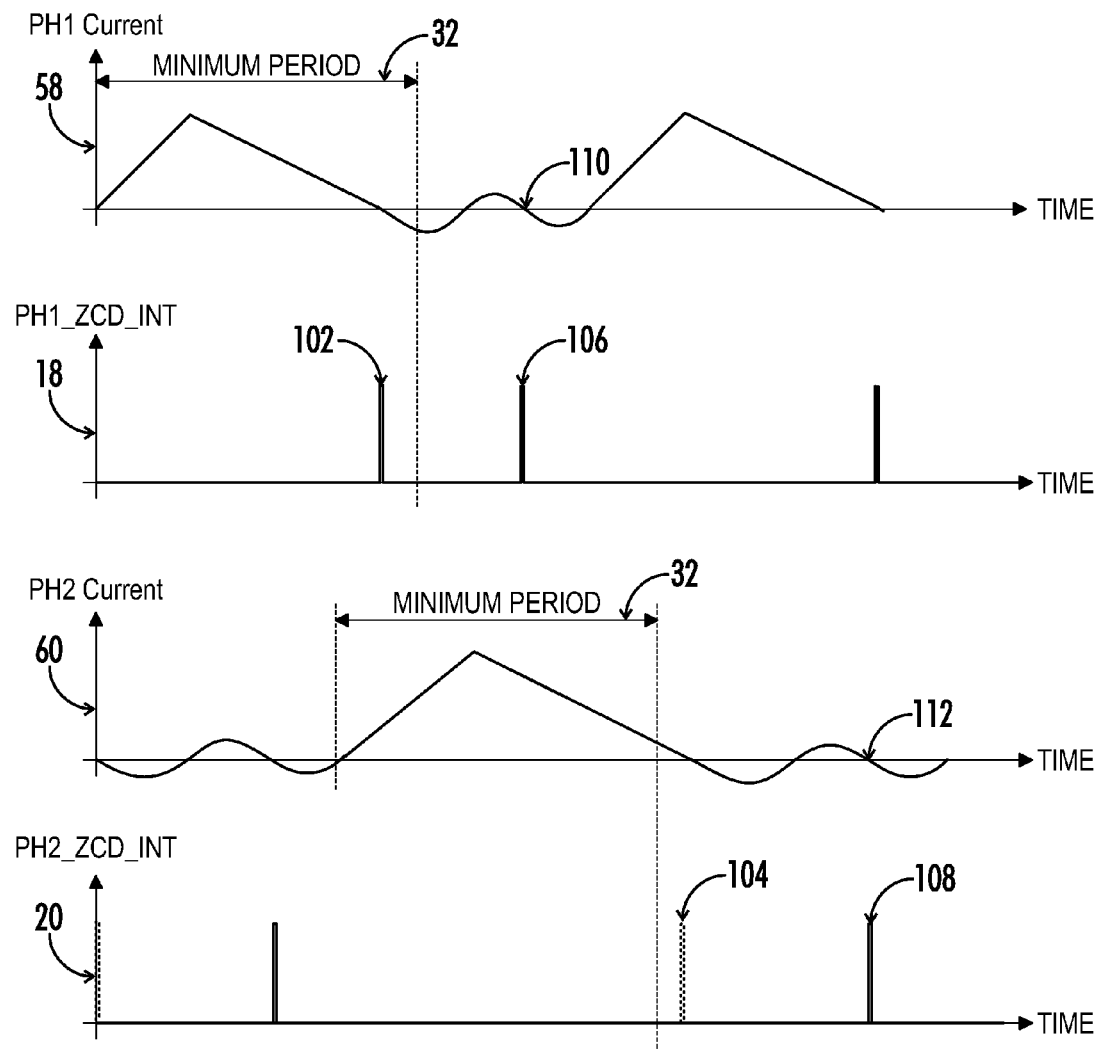
FIG. 6 is a timing diagram of a multiphase power converter operating in the discontinuous mode and exhibiting valley switching locking.

Referring to FIG. 6, a timing diagram shows switching waveforms of the disclosed valley switching locking circuit 6. The input current to the first phase 58 is working in clamped frequency operation that is determined by the minimum period 32. As long as the minimum period 32 has not elapsed, every zero crossing detection signal is ignored within the first waveform generator 4. Thus, in the illustrated waveforms, the first zero crossing pulse 102 of the first zero crossing signal 18 is ignored by the first waveform generator 4. In this state, the multiphase power converter 600 is working in the discontinuous mode, and is awaiting the next zero crossing signal that is not within the minimum period 32. During this time, the input current of the first phase circuit is oscillating due to the parasitic capacitances of the first drive switch 46. At time instant 110, another zero crossing 106 occurs that is not within the minimum period requirement 32 and restarts the first PWM module 4.

Within the illustrated waveforms, the slave phase (i.e., the second phase circuit) has a larger on-time value, and as a result, the minimum period requirement 32, would not capture the first zero crossing pulse 104 of the input current to the second phase circuit. Hence, the slave phase would be working in the transition mode without valley switching locking circuit 6. To avoid this situation, the disclosed valley switching locking circuit 6 does not allow the slave phase (i.e., the second phase) to restart the second PWM module 8 upon detection of the zero crossing pulse 104, because the slave phase has to await the same number of zero crossings as the master phase. The slave phase PWM module 8 is then restarted at the second zero crossing signal pulse, and thus is working in the same valley switching mode as the master phase (i.e., the first phase). This is applicable to multiple slave phases, and is not limited to a single slave phase.

Figure 7:
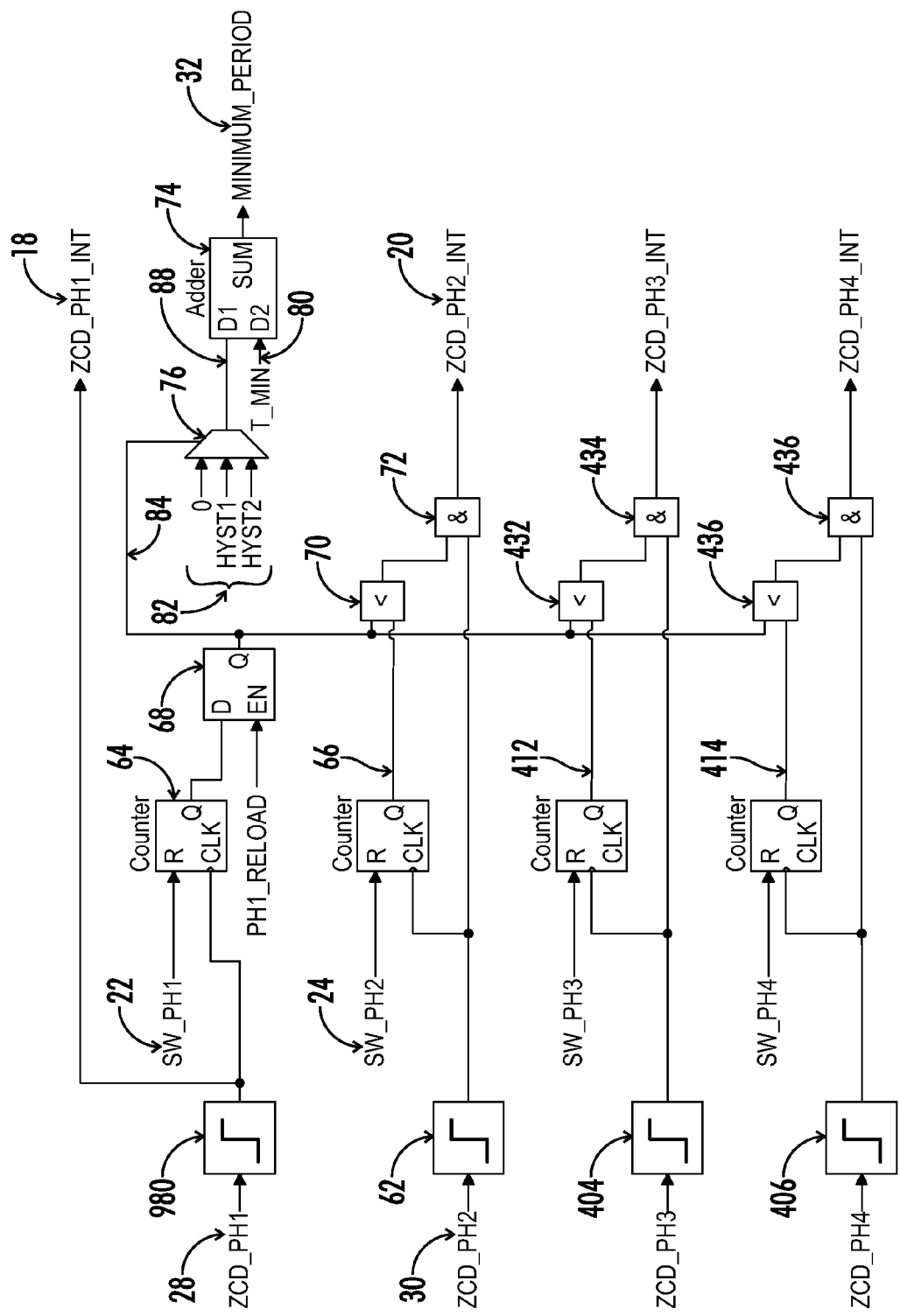
FIG. 7 is a block diagram of a valley switching locking circuit for a 4 phase multiphase power converter.

Referring to FIG. 7, one embodiment of the valley switching locking circuit 6 is adapted for use with four phase circuits. Three slave phases (i.e., the second phase circuit, a third phase circuit, and a fourth phase circuit) compare their zero crossing count values with the zero crossing count value of a master phase (i.e., the first phase circuit). The minimum period 32 is derived from the master phase zero crossing count value and distributed to the waveform generators for all four phases.

Figure 8:
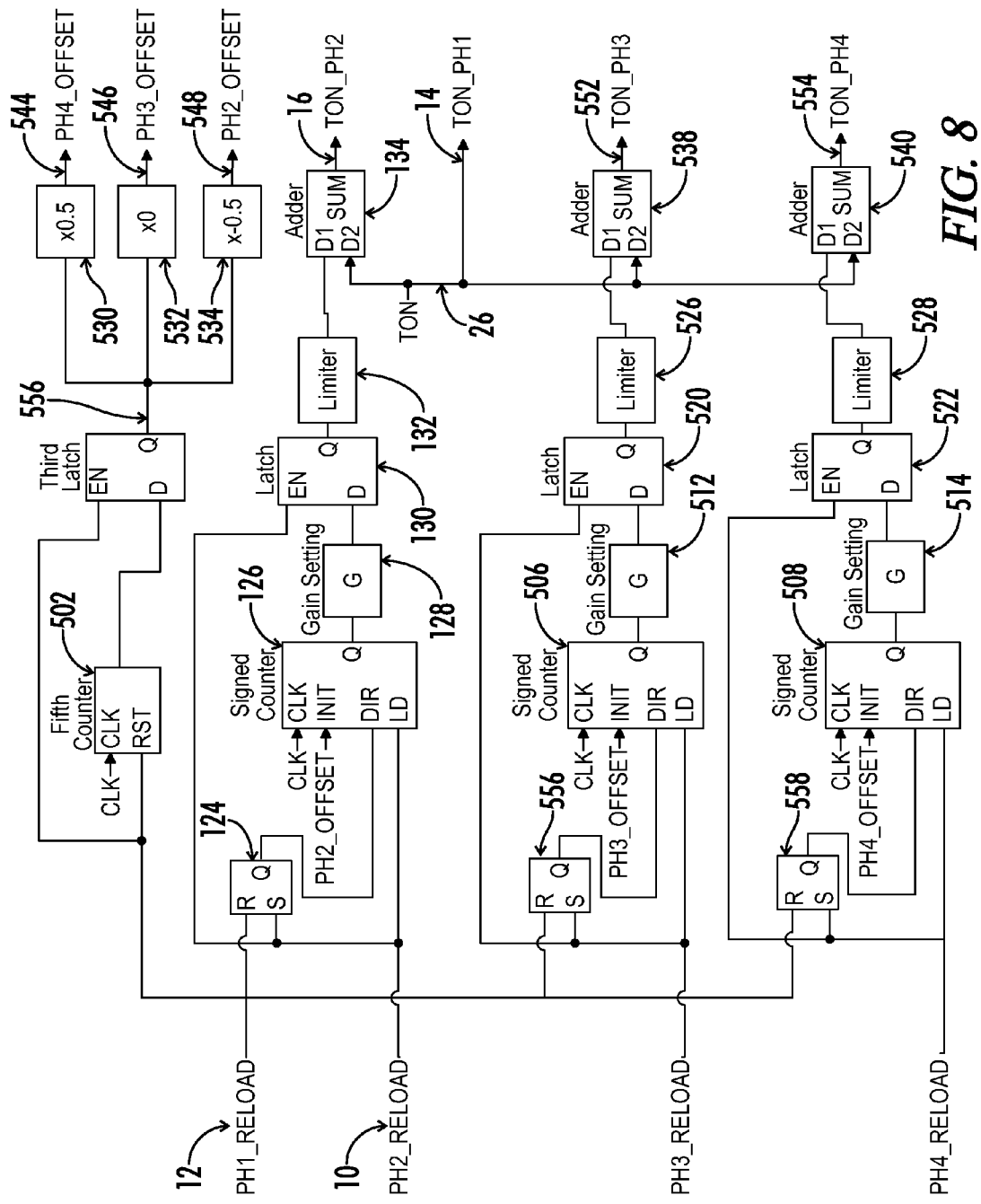
FIG. 8 is a block diagram of a phase control circuit implementing proportional control for four phases of a multiphase power converter.

Referring to FIG. 8, a phase control circuit 2 provides on-times for four phases. The phase control circuit 2 is similar to the phase control circuit in FIG. 2, except that the phase control circuit 2 of FIG. 8 has on-time determining channels for a third phase and a fourth phase similar to the on-time determining channel for the second phase of the phase control circuit 2 of FIG. 2. However, because the phase difference is determined on a time basis, offsets (i.e., init values) for the signed counters of each of the second, third and fourth phase on-time determining channels is calculated by the phase control circuit 2 for each switching period. A fifth counter 502 receives the first phase reload signal 12 and a clock signal and provides an output to a D input of a third latch 516. An output 556 of the third latch 516 is provided to each multiplier of a group of multipliers. A fourth phase multiplier 530 multiplies the output signal 556 by 0.5 to obtain the offset for the fourth phase 544. A third phase multiplier 532 multiplies the output signal 556 by zero to obtain the offset for the third phase 546. A second phase multiplier 534 multiplies the output signal 556 by −0.5 to obtain the second phase offset 548. The phase offsets 544, 546, and 548 are provided to the init inputs of the corresponding signed counters 508, 506, and 126, respectively. The proper phase offset 544, 546 and 548 for the slave phases is determined by measuring the period time of the master phase using the fifth counter 502. The output of the fifth counter 502, which represents the switching period of the master phase, is latched with third latch 516. The output 556 of the third latch 516 is taken into account to derive the proper offset for the counters 126, 506 and 508. In this embodiment, the counter offsets are determined using multipliers 530, 532 and 534 to obtain a 90 degrees phase relation between all four phases. It is contemplated that other phase relations can be achieved as well by using different functions for the multipliers 530, 532 and 534.

Figure 9:
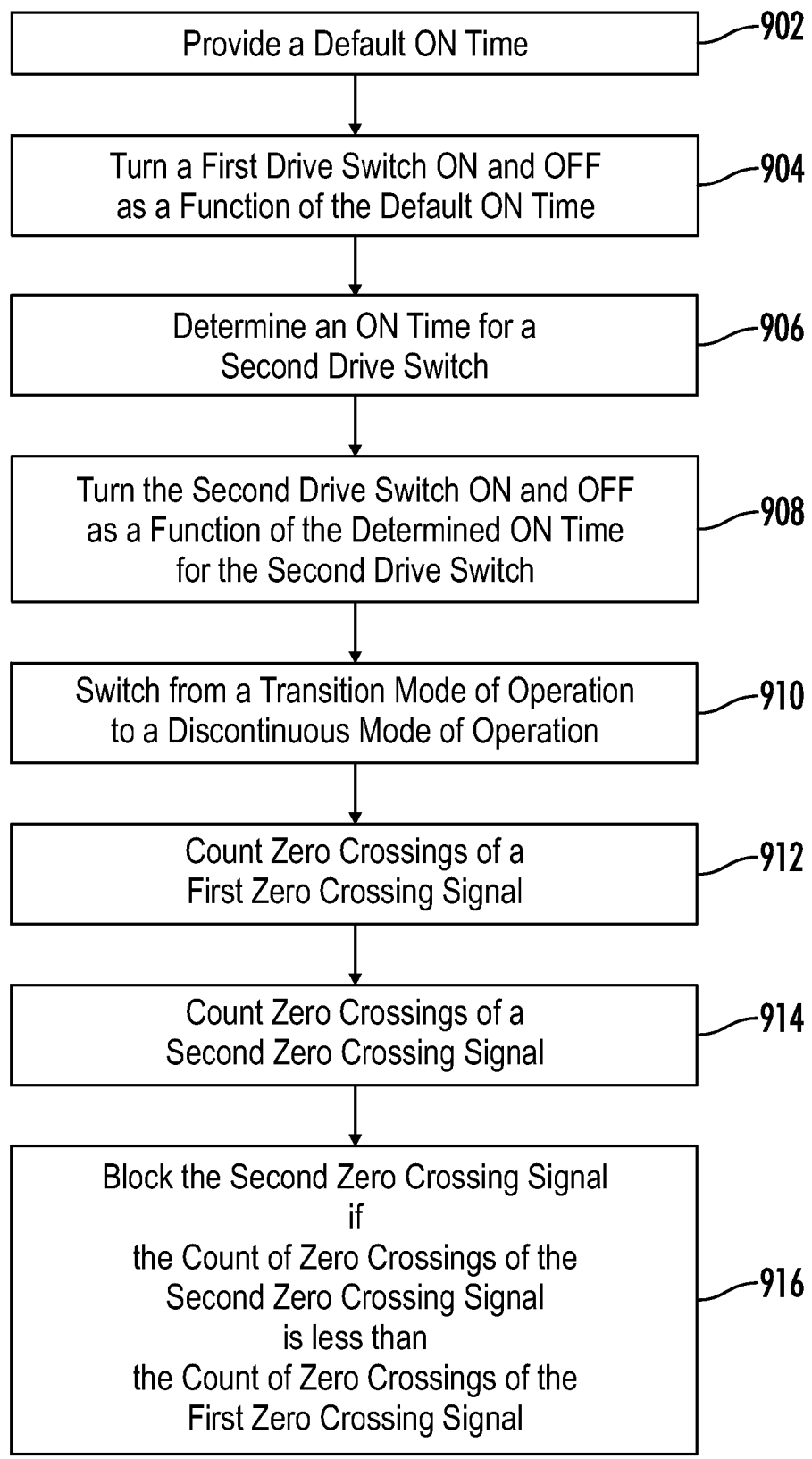
FIG. 9 is a flow chart of a method of operating a multiphase power converter including phase control and valley switching locking.

Referring to FIG. 9, a method of operating a multiphase power converter having a first phase circuit and a second phase circuit begins with providing a default on-time at 902. The default on-time is provided via a voltage control loop as a function of an output voltage at an output of the multiphase power converter. At 904, a controller of the multiphase power converter turns a first drive switch of the first phase circuit on and off as a function of the default on-time provided by the voltage control loop. At 906, an on-time for a second drive switch of the second phase circuit is determined as a function of the default on-time and a phase difference between the first phase circuit and the second phase circuit. At 908, the controller turns the second drive switch of the second phase circuit on and off as a function of the determined on-time for the second drive switch. At 910, the multiphase power converter switches from a transition mode of operation to a discontinuous mode of operation when a switching period of the first phase circuit is less than a minimum period. At 912, a first counter counts zero crossings of a first zero crossing signal in a switching period of the first drive switch. The first zero crossing signal is associated with an input current of the first phase circuit. At 914, a second counter counts zero crossings of a second zero crossing signal in a switching period of the second drive switch corresponding to the switching period of the first drive switch. The second zero crossing signal is associated with an input current of the second phase circuit. At 916, a comparator of the controller blocks the second zero crossing signal (i.e., pulses of the second zero crossing signal indicating a zero crossing) if the count of zero crossings of the second zero crossing signal in the switching period of the second drive switch corresponding to the switching period of the first drive switch is less than the count of zero crossings of the first zero crossing signal in the switching period of the first drive switch. The controller further turns the first drive switch of the first phase circuit on and off as a function of a minimum period and the first zero crossing signal. The controller further turns the second drive switch of the second phase circuit on and off as a function of the minimum period and the second zero crossing signal when the second zero crossing signal is not blocked by the comparator.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, computing device, or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention, it is not intended that such references be construed as limitations upon the scope of this invention except as set forth in the following claims.

What is claimed is:

1. A multiphase power converter comprising:
a first phase circuit comprising
a first input inductor having a first end and a second end, wherein the first end is connected to a power source,
a first drive switch connected between the second end of the first input inductor and ground, and
a first rectification component having an anode connected to the second end of the first input inductor and a cathode connected to an output of the power converter;
a second phase circuit comprising
a second input inductor having a first end and a second end, wherein the first end is connected to the power source,
a second drive switch connected between the second end of the second input inductor and ground, and
a second rectification component having an anode connected to the second end of the second input inductor and a cathode connected to the output of the power converter; and
a controller comprising
a voltage control loop operable to provide a default on-time as a function of a voltage at the output of the power converter,
a first waveform generator operable to provide a first control signal to the first drive switch of the first phase circuit to control whether the first drive switch is on or off, and to provide a first reload pulse at a predetermined point in each period of the first control signal, wherein the first waveform generator provides the first control signal to the first drive switch based on the default on-time,
a second waveform generator operable to provide a second control signal to the second drive switch of the second phase circuit to control whether the second drive switch is on or off, and to provide a second reload pulse at a predetermined point in each period of the second control signal, and
a phase control circuit comprising
a signed counter operable to measure a phase error time from receiving one reload pulse of the first and second reload pulses until receiving the other reload pulse of the first and second reload pulses, and
an adder operable to add the phase error time to the default on-time to provide a second on-time for the second phase circuit, wherein the second waveform generator provides the second control signal to the second drive switch based on the second on-time.

2. The multiphase power converter of claim 1, wherein the phase control circuit further comprises a limiter operable to limit the phase difference time provided to the adder.

3. The multiphase power converter of claim 1, wherein the phase control circuit further comprises a gain circuit operable to modify the phase difference time by multiplying the phase difference time by a gain constant.

4. The multiphase power converter of claim 1 wherein the phase control circuit further comprises a second adder operable to modify the phase error time by adding the phase error time from a previous cycle to the phase error time of the present cycle.

5. The multiphase power converter of claim 1, wherein the multiphase power converter comprises exactly two phase circuits, and wherein the phase control circuit is operable to determine the on-time for the second drive switch as a function of the default on-time and the phase difference between the first phase circuit and the second phase circuit to operate the second phase circuit 180 degrees out of phase from the first phase circuit.

6. The multiphase power converter of claim 1, wherein the multiphase power converter further comprises a third phase circuit having a third drive switch and a fourth phase circuit having a fourth drive switch, the multiphase power converter comprises exactly four phase circuits, and the phase control circuit is operable to determine the on-time for the second drive switch as a function of the default on-time and the phase difference between the first phase circuit and the second phase circuit to operate the second phase circuit 180 degrees out of phase from the first phase circuit,
  an on-time for the third drive switch of the third phase circuit as a function of the default on-time and a phase difference between the first phase circuit and the third phase circuit to operate the third phase circuit 90 degrees out of phase from the first phase circuit, and
  an on-time for the fourth drive switch of the fourth phase circuit as a function of the default on-time and a phase difference between the first phase circuit and the fourth phase circuit to operate the fourth phase circuit 270 degrees out of phase from the first phase circuit.

7. The multiphase power converter of claim 1, wherein the multiphase power converter operates in the transition mode until the phase difference between the first phase circuit and the second phase circuit reaches a predetermined phase difference.

8. The multiphase power converter of claim 1, wherein the first drive switch is conductive when the first drive switch is turned on by the controller and is not conductive when the first drive switch is turned off by the controller, and the second drive switch is conductive when the second drive switch is turned on by the controller and is not conductive when the second drive switch is turned off by the controller.

9. The multiphase power converter of claim 1, wherein the controller further comprises:
  a valley switching locking circuit comprising
    a first counter operable to count zero crossings of a first zero crossing signal in a switching period of the first drive switch, wherein the first zero crossing signal is associated with an input current of the first phase circuit,
    a second counter operable to count zero crossings of a second zero crossing signal in a switching period of the second drive switch, wherein the second zero crossing signal is associated with an input current of the second phase circuit, and
    a comparator operable to block the second zero crossing signal if the count of zero crossings of the second zero crossing signal in the switching period of the second drive switch is less than the count of zero crossings of the first zero crossing signal in the switching period of the first drive switch.

10. The multiphase power converter of claim 1 further comprising a third phase circuit having a third drive switch and a fourth phase circuit having a fourth drive switch, wherein the controller is operable to selectively turn the third drive switch on and off to cycle the third drive switch of the third phase circuit and to selectively turn the fourth drive switch on and off to cycle the fourth drive switch of the fourth drive circuit.

11. A multiphase power converter comprising:
  a first phase circuit comprising
    a first input inductor having a first end and a second end, wherein the first end is connected to a power source,
    a first drive switch connected between the second end of the first input inductor and ground, and
    a first output diode having an anode connected to the second end of the first input inductor and a cathode connected to an output of the power converter;
  a second phase circuit comprising
    a second input inductor having a first end and a second end, wherein the first end is connected to the power source,
    a second drive switch connected between the second end of the second input inductor and ground, and
    a second output diode having an anode connected to the second end of the second input inductor and a cathode connected to the output of the power converter; and
  a controller operable to selectively turn the first drive switch of the first phase circuit on and off to cycle the first drive switch of the first phase circuit and to selectively turn the second drive switch of the second drive circuit on and off to cycle the second drive switch of the second drive circuit, the controller comprising
  a valley switching locking circuit comprising
    a first counter operable to count zero crossings of a first zero crossing signal in a switching period of the first drive switch, wherein the first zero crossing signal is associated with an input current of the first phase circuit,
    a second counter operable to count zero crossings of a second zero crossing signal in a switching period of the second drive switch, wherein the second zero crossing signal is associated with an input current of the second phase circuit, and
    a comparator operable to block the second zero crossing signal if the count of zero crossings of the second zero crossing signal in the switching period of the second drive switch is less than the count of zero crossings of the first zero crossing signal in the switching period of the first drive switch.

12. The multiphase power converter of claim 11, wherein the controller further comprises:
  a first zero crossing detector operable to provide the first zero crossing signal, wherein the first zero crossing signal is indicative of the input current of the first phase circuit changing from positive to negative; and
  a second zero crossing detector operable to provide the second zero crossing signal, wherein the second zero crossing signal is indicative of the input current of the second phase circuit changing from positive to negative.

13. The multiphase power converter of claim 11, wherein the controller further comprises:
  a first waveform generator operable to provide a first control signal to the first drive switch of the first phase circuit for controlling whether the first drive switch is on or off, wherein the first waveform generator provides the first control signal to the first drive switch based on an on time for the first drive switch, the first zero crossing signal, and a minimum period;
  a second waveform generator operable to provide a second control signal to the second drive switch of the second phase circuit for controlling whether the second drive switch is on or off, wherein the second waveform generator provides the second control signal to the second drive switch based on an on time for the second drive switch, the second zero crossing signal, and the minimum period; and wherein the valley switching locking circuit blocks the second zero crossing signal for the second waveform generator if the count of zero crossings of the second zero crossing signal in the switching period of the second drive switch is less than the count of zero crossings of the first zero crossing signal in the switching period of the first drive switch.

14. The multiphase power converter of claim 13, wherein:
the first waveform generator provides the first control signal to the first drive switch of the first phase circuit to turn the first drive switch on when the first zero crossing signal indicates that the input current of the first phase circuit is changing from positive to negative and the minimum period has elapsed; and the second waveform generator provides the second control signal to the second drive switch of the second phase circuit to turn the second drive switch on when the second zero crossing signal is not blocked by the valley switching locking circuit, indicates that the input current of the second phase circuit is changing from positive to negative, and the minimum period has elapsed.

15. The multiphase power converter of claim 11, wherein the valley switching locking circuit further comprises a hysteresis circuit for varying a minimum period of the cycle of the first phase circuit and the second phase circuit as a function of the count of zero crossings of the first zero crossing signal in the switching period of the first drive switch.

16. The multiphase power converter of claim 11, wherein the valley switching locking circuit does not block the second zero crossing signal until the multiphase power converter switches from a transition mode of operation to a discontinuous mode of operation.

17. The multiphase power converter of claim 11, wherein the multiphase power converter operates in a transition or discontinuous mode of operation until the phase difference between the first phase circuit and the second phase circuit reaches a predetermined phase difference.

18. The multiphase power converter of claim 11, wherein the first drive switch is conductive when the first drive switch is turned on by the controller and is not conductive when the first drive switch is turned off by the controller, and the second drive switch is conductive when the second drive switch is turned on by the controller and is not conductive when the second drive switch is turned off by the controller.

19. The multiphase power converter of claim 11, wherein the comparator comprises a digital comparator and an AND logic gate, and wherein the AND logic gate provides the second zero crossing signal to a second waveform generator of the controller when the digital comparator indicates that the count of the second counter is not less than the count of the first counter.

20. The multiphase power converter of claim 11, wherein the first counter is operable to start counting at zero, and the second counter is operable to start counting at one.

21. The multiphase power converter of claim 11, wherein the controller further comprises:
a voltage control loop operable to provide a default on-time as a function of a voltage at the output of the power converter, wherein the controller is operable to selectively turn the first drive switch on and off as a function of the default on-time provided by the voltage control loop; and a phase control circuit operable to determine an on-time for the second drive switch as a function of the default on-time and a phase difference between the first phase circuit and the second phase circuit, wherein the controller is operable to selective turn the second drive switch on and off as a function of the on-time for the second drive switch.

22. The multiphase power converter of claim 11 further comprising a third phase circuit and a fourth phase circuit, wherein the controller is operable to selectively turn a third drive switch of the third phase circuit on and off to cycle the third drive switch of the third phase circuit and to selectively turn a fourth drive switch of the fourth drive circuit on and off to cycle the fourth drive switch of the fourth drive circuit.

23. A method of operating a multiphase power converter having a first phase circuit and a second phase circuit, the method comprising:
providing a default on-time via a voltage control loop as a function of an output voltage at an output of the multiphase power converter, turning a first drive switch of the first phase circuit on and off as a function of the default on-time provided by the voltage control loop;

determining an on-time for a second drive switch of the second phase circuit as a function of the default on-time and a phase difference between the first phase circuit and the second phase circuit, turning the second drive switch of the second phase circuit on and off as a function of the determined on-time for the second drive switch;

switching from a transition mode of operation to a discontinuous mode of operation when a switching period of the first phase circuit is shorter than a minimum period;

counting zero crossings of a first zero crossing signal in a switching period of the first drive switch via a first counter, wherein the first zero crossing signal is associated with an input current of the first phase circuit;

counting zero crossings of a second zero crossing signal in a switching period of the second drive switch via a second counter, wherein the second zero crossing signal is associated with an input current of the second phase circuit; and blocking the second zero crossing signal via a comparator if the count of zero crossings of the second zero crossing signal in the switching period of the second drive switch is less than the count of zero crossings of the first zero crossing signal in the switching period of the first drive switch; wherein:

turning the first drive switch of the first phase circuit on and off as a function of the default on-time further comprises turning the first drive switch of the first phase circuit on as a function of a minimum period and the first zero crossing signal; and turning the second drive switch of the second phase circuit on and off as a function of the determined on-time for the second drive switch comprises turning the second drive switch of the second phase circuit on as a function of the minimum period and the second zero crossing signal when the second zero crossing signal is not blocked by the comparator.

24. A multiphase power converter comprising:
a first phase circuit comprising
a first input inductor having a first end and a second end, wherein the first end is connected to a power source,
a first drive switch connected between the second end of the first input inductor and ground, and a first rectification component having an anode connected to the second end of the first input inductor and a cathode connected to an output of the power converter;

a second phase circuit comprising
- a second input inductor having a first end and a second end, wherein the first end is connected to the power source,
- a second drive switch connected between the second end of the second input inductor and ground, and
- a second rectification component having an anode connected to the second end of the second input inductor and a cathode connected to the output of the power converter;

a third phase circuit having a third drive switch;

a fourth phase circuit having a fourth drive switch; and a controller comprising
- a voltage control loop operable to provide a default on-time as a function of a voltage at the output of the power converter, wherein the controller is operable to selectively turn the first drive switch on and off as a function of the default on-time provided by the voltage control loop, and
- a phase control circuit operable to
  - determine an on-time for the second drive switch as a function of the default on-time and the phase difference between the first phase circuit and the second phase circuit to operate the second phase circuit 180 degrees out of phase from the first phase circuit,
  - determine an on-time for the third drive switch of the third phase circuit as a function of the default on-time and a phase difference between the first phase circuit and the third phase circuit to operate the third phase circuit 90 degrees out of phase from the first phase circuit, and
  - determine an on-time for the fourth drive switch of the fourth phase circuit as a function of the default on-time and a phase difference between the first phase circuit and the fourth phase circuit to operate the fourth phase circuit 270 degrees out of phase from the first phase circuit.

25. A multiphase power converter comprising:
a first phase circuit comprising
- a first input inductor having a first end and a second end, wherein the first end is connected to a power source,
- a first drive switch connected between the second end of the first input inductor and ground, and
- a first rectification component having an anode connected to the second end of the first input inductor and a cathode connected to an output of the power converter;

a second phase circuit comprising
- a second input inductor having a first end and a second end, wherein the first end is connected to the power source,
- a second drive switch connected between the second end of the second input inductor and ground, and
- a second rectification component having an anode connected to the second end of the second input inductor and a cathode connected to the output of the power converter; and a controller operable to selectively turn the first drive switch of the first phase circuit on and off to cycle the first drive switch of the first phase circuit and to selectively turn the second drive switch of the second drive circuit on and off to cycle the second drive switch of the second drive circuit, the controller comprising
- a voltage control loop operable to provide a default on-time as a function of a voltage at the output of the power converter, wherein the controller is operable to selectively turn the first drive switch on and off as a function of the default on-time provided by the voltage control loop,
- a phase control circuit operable to determine an on-time for the second drive switch as a function of the default on-time and a phase difference between the first phase circuit and the second phase circuit, wherein the controller is operable to selectively turn the second drive switch on and off as a function of the on-time for the second drive switch, and
- a valley switching locking circuit comprising
  - a first counter operable to count zero crossings of a first zero crossing signal in a switching period of the first drive switch, wherein the first zero crossing signal is associated with an input current of the first phase circuit,
  - a second counter operable to count zero crossings of a second zero crossing signal in a switching period of the second drive switch, wherein the second zero crossing signal is associated with an input current of the second phase circuit, and
  - a comparator operable to block the second zero crossing signal if the count of zero crossings of the second zero crossing signal in the switching period of the second drive switch is less than the count of zero crossings of the first zero crossing signal in the switching period of the first drive switch.

* * * * *